(12) United States Patent
Gray, Jr.

(10) Patent No.: US 7,032,385 B2
(45) Date of Patent: *Apr. 25, 2006

(54) MULTI-CRANKSHAFT, VARIABLE-DISPLACEMENT ENGINE

(75) Inventor: Charles L. Gray, Jr., Pinckney, MI (US)

(73) Assignee: The United States of America as represented by the Administrator of the U.S. Environmental Protection Agency, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/000,369

(22) Filed: Dec. 1, 2004

(65) Prior Publication Data

US 2005/0150228 A1 Jul. 14, 2005

Related U.S. Application Data

(63) Continuation of application No. 10/378,627, filed on Mar. 5, 2003.

(51) Int. Cl.
*F01B 21/04* (2006.01)
(52) U.S. Cl. .............................. 60/716; 60/718; 60/709
(58) Field of Classification Search ................. 60/698, 60/709, 716, 718; 180/2.1
See application file for complete search history.

(56) References Cited

U.S. PATENT DOCUMENTS

| | | | |
|---|---|---|---|
| 4,064,861 A | 12/1977 | Schulz | 123/198 |
| 4,069,803 A | 1/1978 | Cataldo | 123/198 |
| 4,331,111 A | 5/1982 | Bennett | 123/192 |
| 4,337,623 A | 7/1982 | Kronogard | 60/716 |
| 4,373,481 A | 2/1983 | Kruger et al. | 123/198 |
| 4,385,600 A | 5/1983 | Sugasawa et al. | 123/198 |
| 4,421,217 A | 12/1983 | Vagias | 192/0.098 |
| 4,494,502 A | 1/1985 | Endo et al. | 123/198 |
| 4,512,301 A | 4/1985 | Yamakawa | 123/198 |
| 4,566,279 A | 1/1986 | Kronogard et al. | 60/718 |
| 4,638,637 A | 1/1987 | Kronogard et al. | 60/718 |
| 5,398,508 A | 3/1995 | Brown | 60/718 |
| 5,490,486 A | 2/1996 | Diggs | 123/198 |
| 5,595,147 A | 1/1997 | Feuling | 123/52.4 |
| 5,638,777 A | 6/1997 | Van Avermaete | 123/52.4 |
| 5,870,979 A | 2/1999 | Wittner | 123/52.4 |
| 5,890,365 A | 4/1999 | Sisti | 60/709 |
| 5,971,092 A * | 10/1999 | Walker | 180/308 |
| 6,065,440 A | 5/2000 | Pasquan | 123/198 |
| 6,098,733 A | 8/2000 | Ibaraki et al. | 180/65.2 |
| 6,306,056 B1 | 10/2001 | Moore | 475/5 |
| 6,365,983 B1 | 4/2002 | Masberg et al. | 290/40 |
| 6,371,878 B1 | 4/2002 | Bowen | 475/5 |
| 6,658,852 B1 | 12/2003 | Frey | 60/716 |
| 6,722,458 B1 * | 4/2004 | Hofbauer | 180/65.4 |

* cited by examiner

Primary Examiner—Hoang Nguyen
(74) Attorney, Agent, or Firm—Bacon & Thomas, PLLC

(57) ABSTRACT

An internal combustion engine for a vehicle provides variable displacement by selectively driving one or more engine crankshafts mounted within a single unitary engine block. In several embodiments the crankshafts are connected to a common output shaft with a one-way clutch between the common output shaft and at least one of the crankshafts. In one aspect starter gearing is independently associated with each of the first and second crankshafts and a starter is provided for selective engagement with the starter gearing of either of the crankshafts. In another aspect, an accessory drive for driving accessory systems of the vehicle receives power from any crankshaft which is operating, yet is isolated from any crankshaft that is not operating by a one-way clutch.

12 Claims, 6 Drawing Sheets

Unidirectional cranks, center output, rear accessories

Counter-rotating cranks, side output, rear accessories

*Unidirectional cranks, center output, front accessories*

*Counter-rotating cranks, side output, front accessories*

*Jackshaft accessory drive*

*Flywheel removed, operating strategy A, and options*

MULTI-CRANKSHAFT, VARIABLE-DISPLACEMENT ENGINE

CROSS-REFERENCE TO RELATED APPLICATIONS

This application is a Continuation of U.S. Ser. No. 10/378,627 filed Mar. 5, 2003, pending.

BACKGROUND OF THE INVENTION

1. Field of the Invention

The general field of application is internal combustion engines, particularly internal combustion engines for automotive use. More specifically, the invention relates to variable displacement in an internal combustion power plant.

2. The Prior Art

The growing utilization of automobiles greatly adds to the atmospheric presence of various pollutants including oxides of nitrogen and greenhouse gases such as carbon dioxide. Accordingly, new approaches to significantly improving the efficiency of fuel utilization for automotive powertrains are needed.

In most current automotive powertrain designs, an internal combustion engine (ICE) is employed as the source of motive power. The average power demanded in normal driving is quite small, but intermittent events such as rapid acceleration, passing, trailer towing, and hill climbing demand power far in excess of the average demand. Because the ICE must respond in real time to the varying power demands of driving, it must be powerful enough to accommodate the maximum anticipated power demand rather than only the average power demand.

From an efficiency perspective, the powertrain required by the above considerations is far from optimal. The energy conversion efficiency of an ICE is at its optimum over only a relatively narrow range of its permissible loads and operating speeds. Efficiency tends to be better at high load than at low load, and better at moderate speed than at either low speed or high speed. Because an automotive ICE is typically sized to meet the maximum anticipated power demand (which is experienced over only a small fraction of a typical driving cycle), the vast majority of the time it operates at low to moderate power levels where efficiency is relatively poor. This results in a relatively poor net fuel economy.

Operation of the ICE within its most efficient operating range (i.e. nearer its peak load) over a larger fraction of the typical driving cycle, would dramatically improve fuel economy. One possible approach would be to simply size the ICE to match the anticipated average power demand rather than the anticipated maximum demand, so that its peak efficiency range would more frequently coincide with the power actually demanded by the vehicle. However, this would give no capability for meeting peak power demands, leading to unacceptable problems in performance, driver confidence, and safety.

The problem of achieving better automotive energy efficiency in an ICE-powered vehicle can thus be understood as a problem of operating its ICE components at or near their most efficient operating range during the greatest possible portion of the driving cycle, while preserving the ability to meet peak power demands however intermittently they occur.

The techniques of turbocharging and supercharging aim to circumvent the constraint of a fixed volumetric displacement by compressing the intake air so as to allow a greater mass of air (and hence fuel) to enter each charge, effectively creating a variable effective (not volumetric) displacement. It should be noted that these techniques do not in any way obviate the desirability of achieving true variable volumetric displacement, because they could equally well be applied to an engine that has a variable volumetric displacement, providing an even broader range of power capabilities than either technique alone.

It is well known in the prior art to vary the net displacement of a single engine by switching one or more of its cylinders between a power producing mode and an idling mode. Many approaches have been used to control participation of the individual cylinders. For example, the invention disclosed in U.S. Pat. No. 4,494,502 granted to Endo et al. (1985) deactivates cylinders by denying them air and fuel; U.S. Pat. No. 5,490,486 (Diggs 1996) deactivates cylinders via selective valve control, and U.S. Pat. No. 4,064,861 (Schulz 1977) cuts off fuel flow and engages a compression release. U.S. Pat. No. 6,065,440 granted to Pasquan (2000) uses similar techniques to activate and deactivate individual cylinders of varying individual displacements to provide an even wider range of net displacements than possible with cylinders of identical displacement. The main shortcoming of designs of this type derives from the fact that all cylinders are connected to a common crankshaft, and so any cylinder that is not in a power producing mode continues to have a piston reciprocating within it, leading to energy losses due to friction and other effects.

It is also known to split a multi-cylinder engine into two or more relatively independent displacement units. Such so-called "split-engine" designs split the crankshaft of a multi-cylinder engine into two or more parts, each connecting to a group of cylinders (or cylinder bank) that now may operate relatively independently from the other cylinder banks. However, in these designs the cylinders continue to share a common valve train, which means that each idle crankshaft must regain its appropriate angular position relative to the others when it is reactivated. This requires a rather complex synchronization means. For example, U.S. Pat. No. 4,069,803 issued to Cataldo (1978) and U.S. Pat. No. 4,373,481 issued to Kruger et al (1983) both disclose clutch indexing mechanisms for such an arrangement, which mechanisms add a layer of complexity, cost, and unreliability to such a power plant.

Rather than selectively actuating individual cylinders connected to a common crankshaft, or cylinder banks connected to split synchronized crankshafts, another approach would selectively actuate two or more separate engines. For example, an ICE-based powertrain having a second engine is disclosed in U.S. Pat. No. 5,495,912, "Hybrid Powertrain Vehicle" (Gray, Jr., et al). A multiple engine system might in one version consist of a primary engine sized to match average power demand, supplemented by a secondary engine that can be activated to meet peak demand. In another version, multiple engines could be individually sized to each serve a specific range of power demands at which its respective efficiency is greatest.

The concept of achieving variable displacement via a combination of engines is not new. Several U.S. patents describe separate engines mechanically tied through a gearing arrangement. U.S. Pat. No. 4,392,393 (Montgomery), "Dual Engine Drive" describes two engines tied together by a planetary gear set, with a torque converter uniting the power of the two engines, one or both of which may be active at any time. In U.S. Pat. No. 4,481,841 (Abthoff et al.), "Multiple Engine Drive Arrangement", a minimum of three engines are connected by means of freewheeling clutches, and can be selectively operated in parallel or in a series arrangement. Kronogard in U.S. Pat. No. 4,337,623 suggests a universal base block onto which multiple standard engines may be connected to form variable displacement power plants of increasing size. U.S. Pat. No. 4,421,217 (Vagias 1983) teaches a dual-engine system in which a clutching means is employed to unite the output of two engines and/or operate one independently of the other. The larger engine when activated delivers its power through the crankshaft of the smaller engine in a tandem arrangement. Another example of a multi-engine powertrain is disclosed in U.S. Pat. No. 5,398,508 (Brown 1995) and employs a primary engine supplemented by an auxiliary engine.

Multiple-engine powertrains such as described above present several engineering difficulties that limit their practicality in automotive applications. The need to frequently start and stop the engines is one difficulty. Conventional ICEs employed in such a system would encounter significant efficiency losses and increased emissions as a result of frequent restarting. Driver confidence might also be negatively influenced if the driver perceives the frequent starting and stopping of the engines as a reliability risk. Accessories present another difficulty because conventional accessories are powered by direct engine power, meaning that at least one engine capable of driving accessories must always be running. This is especially problematic in certain hybrid vehicle applications, in which there may be times when no engine power is needed at all, in which case accessories would have to be driven by a different power source entirely. The method of operation of the power plant is also critical. For example, a method of operation that requires one engine to run more frequently or to routinely experience greater loads might cause it to wear out faster and increase the frequency of trips to the repair shop. Yet another concern is the need for multiple starting means for multiple engines. For example, the powertrain disclosed in U.S. Pat. No. 4,512,301 (Yamakawa 1985) requires a separate starter for each engine unit. The inertia of the moving vehicle may alternatively be employed to start an offline engine, but inertia is not available if the vehicle is at a stop. Still another concern is the inertial load imposed on the system when an engine that is offline is reactivated. In particular, if a reactivation event coincides with a demand for greater power, the need to get the inactive engines and their heavy flywheels up to speed competes with the need to deliver power to the vehicle just when it is needed most.

In review of these general methods of providing variable displacement, it becomes clear that there are a number of features that would be required for such a system to be commercially successful in today's automotive market.

Vehicle accessories that are operated by direct drive must always be available when needed and their function must be satisfied cost effectively. Direct drive accessories include at the minimum the alternator, power steering pump and air conditioning compressor. If conventional off-the-shelf accessories are connected in the manner that is conventional for single-crankshaft powertrains, that is, by a belt and pulley drive connected to the engine crankshaft, then one must choose which of the two crankshafts will be so connected, and that crankshaft must always be operating in order to drive the accessories without interruption. This precludes some promising operating strategies that would call for more flexibility. For example, certain operating strategies may call for both displacement units to be turned off at times when no power is demanded from the engine, for example at a dead stop or during a long deceleration, or with certain methods of operation for hybrid powertrains. While each displacement unit could be supplied with its own set of power drive accessories so that the needs of the vehicle may be met whenever either unit is operating, this would add weight, cost, and complexity to the vehicle.

The cost of manufacture should be as low as possible in volume production. This again precludes having multiple sets of the same components, such as a duplicate accessory set for each displacement unit. It also suggests that cooling, lubrication, and other support systems should be combined to the extent possible. All engines should also be started by a common starting means to eliminate the need for multiple starters. The ability to interface the power plant with conventional downstream and peripheral automotive components is also very desirable because it allows the use of components that are already in mass production and available at low cost. Most significantly in this respect, the output of the power plant should be compatible with a conventional transmission, and it should be able to drive conventional power drive accessories by the conventional means for which they are designed (i.e., belts and pulleys).

Transitioning from one level of displacement to another level of displacement should be rapid and seamless to the vehicle operator. Regardless of the form of each displacement unit (whether a cylinder, cylinder bank, or separate engine), transitioning would require the starting of an additional displacement unit (initially not in motion) and then adding its torque output to that of the already operating displacement unit. Therefore, rapidly starting the second displacement unit in a manner that does not affect the motion of the vehicle or reduce the available power is critical.

Maximum lifetime and reliability are also very important from a marketing perspective. To reduce the frequency of repair, it would be desirable to alternate which engine receives the heaviest duty cycle, to prevent uneven wear and premature failure. The ability to alternate engines could also improve safety and reliability of the vehicle overall. If a failure occurred in one of the engines, the other engine could be used to power the vehicle to a repair facility.

Finally, to be compatible with emerging hybrid automotive technologies that may become popular in the future, the power plant should optionally offer more than a single shaft output, perhaps having one shaft output going to the drive wheels and another going to an auxiliary power unit (for a parallel hybrid), or both shafts going to auxiliary power units (for a series hybrid).

To summarize, the following features are desirable for a commercially successful variable displacement automotive power plant:
1. Uninterrupted accessory drive;
2. Low cost of manufacture;
   a. Shared starting means;
   b. Shared cooling and lubrication/support systems;
   c. Compatibility with conventional transmissions and accessories;
3. Smooth transitioning;
4. Good lifetime and reliability; and
5. Possibility of multiple output shafts.

There exist a variety of prior art power plant designs that have some of these features, but in contexts unrelated to variable displacement engines. For example, multi-crankshaft designs are well known in the prior art. Usually, multi-crankshaft engines were used for high power density applications (such as piston-engine military aircraft) where compact packaging with high power were especially important. The crankshafts of such prior art engines were "fixed" together (e.g., with gears or by chain), and all crankshaft power was added together and discharged through a single output shaft. For example, U.S. Pat. No. 4,331,111 granted to Bennett (1982) discloses dual crankshafts which are geared to a common output shaft. This design is typical of high power density designs which merely combine the output of multiple crankshafts without providing for variable displacement by switching one crankshaft in or out. In other designs, it is not uncommon to find each crankshaft geared to a separate output shaft, which allowed output shaft speed to be changed relative to the speed of the crankshafts. This was especially useful for propeller aircraft engines which allowed the crankshafts to have a higher speed than the propeller shaft. Another motivation leading to multiple crankshafts is related to the cancellation of gyroscopic effects by having each piston drive two counter rotating crankshafts via two connecting rods. See, for example, U.S. Pat. No. 5,595,147 (Feuling 1997) and U.S. Pat. No. 5,870, 979 (Wittner 1999). Although all of these inventions do possess multiple crankshafts, none of them achieve variable displacement.

Similarly, the housing of multiple crankshafts in a common engine block is not new. U.S. Pat. No. 5,638,777 (Van Avermaete), "Compression or SI 4-Stroke IC Engines", has two parallel crankshafts each connected to a separate bank of pistons and each having a different stroke, and residing in a common block. But the Van Avermaete invention seeks to provide a variable compression ratio for supercharging effects, not a variable displacement for varying the power capacity of the engine, and so these apparent similarities are motivated by concerns unrelated to the aims of the current invention.

However, there is a limited amount of prior art that does have some of these elements in a variable displacement power plant. One good example is the splitting of an engine into more than one fully independent displacement unit as taught in U.S. Pat. No. 4,566,279 granted to Kronogard et al. (1986). Two relatively small internal combustion engines, referred to as "engine parts", are placed with their respective crankshafts in line and each connected to a central power output or take-off shaft via a continuously variable transmission. A second torque transfer path parallel to the transmission is also provided for driving accessories. U.S. Pat. No. 4,638,637 also granted to Kronogard et al (1987) discloses a more integrated version of this concept, including an internal combustion power plant having an arrangement of two parallel banks of cylinders driving two corresponding parallel crankshafts, all within a single engine block. A clutching means allows the crankshafts to be clutched in or out so that either of the displacement units may run by itself or both may operate together. Alternatively, one of the crankshafts is clutched in and out while the other is permanently coupled to the drivetrain. The output of the two crankshafts is combined by a gearing means, and the combined power is delivered via a single output shaft. Combining the two subengines within a common block, Kronogard asserts, achieves the advantage of having a single cooling and lubrication system common to both displacement units. However, there is no mention of how the individual piston/crankshaft subsystems may be started by a single starter, nor any mention of how vehicle accessories may be driven while one or the other crankshaft is offline.

This concept of multiple integrated displacement units also appears in U.S. Pat. No. 5,971,092 granted to Walker (1999), which discloses an automotive drivetrain featuring a "split" engine. Although the two parts of the split engine do not reside in a common block, this invention has many features similar to Kronogard's invention. A single cooling system (although not a single lubrication system) is shared by the two engine parts. An overrunning clutch and gearing arrangement allows either engine unit to operate alone, or both units to operate together. Accessories are driven by a direct shaft that is backdriven by the transmission, that is, by transmitting the momentum of the vehicle back through the transmission to power the accessories while the vehicle is in motion. The disclosure cites the ability to provide a single set of accessories as an advantage of the invention. Of course, accessory backdrive is not available while the vehicle is stationary, which presents problems for continuous loads such as the air conditioning compressor, and for intermittent loads such as power steering. The disclosure admits that an auxiliary electric power plant may be necessary to provide power steering and presumably other devices such as air conditioning. The starting means for the two engine units is not mentioned, which suggests that two separate starters would be needed.

U.S. Pat. No. 6,306,056 B1 granted to Moore (2001) similarly discloses several embodiments of a hybrid automotive powertrain consisting of first and second engine units and an electric motor/generator. In one embodiment of this powertrain, the two engine units are provided in a single block, with a dual parallel crankshaft design similar to that of Kronogard. A designated first primary crankshaft can operate alone, or a secondary crankshaft may operate to supplement the primary crankshaft via a clutching means, to power a single output shaft. Sharing of a single oil pump, water pump, cooling system, lubrication system, air filter, fuel system, engine block, exhaust system, and oil pan are cited as advantages of this integration. To ensure a rapid and smooth transition when additional power is needed, the electric motor/generator portion of the powertrain supplies additional power during the period in which the secondary engine is getting up to speed, after which the secondary engine takes over and the electric motor is returned to its previous status. Although the engine design of Moore arguably provides many advantages over a conventional engine, it has several shortcomings. First, the two engine units will receive uneven wear because the designated primary engine unit will run more frequently than the second unit. This is especially a problem in the integrated, single-block embodiment because worn components would be less accessible for repair. While the components of the first unit could be designed to be more durable than those of the second unit, it may be difficult for like components of varying quality or tolerancing to coexist in a common block while sharing so many support systems. Second, it is not clear how the primary and secondary units may individually be started without requiring two separate starters, which would add cost and weight to the vehicle. Finally, the disclosure makes no mention of how accessories will be driven. Presumably they will be powered directly by the primary engine, or electrically powered by the motor/generator. In the first case, it is not clear how they will continue to receive power when the primary unit is shut off at times of zero or low power demand. In the second case, conventional power drive accessories would have to be replaced by electrically powered versions which are not as well established in the industry. Also see Gray, Jr., et al—U.S. Pat. No. 5,495,912.

In summary, no prior art system provides variable displacement in an automotive powerplant while providing all of the commercially desirable features enumerated above.

SUMMARY OF THE INVENTION

The present invention adopts a variable displacement approach to provide multiple peak power capabilities, and thus multiple peak efficiency ranges, by varying the net volumetric displacement of the power plant. The term "volumetric displacement" refers to the cylinder volume that is swept by a piston in a cylinder as it travels between the extremes of its stroke. The "net volumetric displacement" (NVD) of a multi-cylinder engine is the sum of the volumetric displacements of its cylinders. NVD is a general indicator of engine power because in a naturally aspirated engine it is the controlling factor in the amount of air that can be inducted in each intake cycle, thus controlling the mass of each fuel-air charge, and accordingly the gross energy that is available in each power generating cycle. In a conventional engine, the volumetric displacement of each cylinder, as well as the NVD of the engine, is fixed, which means that the peak power capability and the corresponding range of peak efficiency are also fixed. However, in the present invention the engine possesses more than one peak power capability, and can thus provide a corresponding peak efficiency at each of its power output levels rather than just one.

Accordingly, the present invention provides an internal combustion engine for a vehicle having variable displacement and including first and second crankshafts mounted within a single unitary engine block. At least two cylinders receiving pistons defining combustion chambers therein are provided for rotatably driving each of the first and second crankshafts by combustion of fuel in the combustion chambers. In one aspect of the present invention, a common output shaft receives power from both of the first and second crankshafts thereby combining the power outputs of the first and second crankshafts to propel the vehicle with the combined power outputs. In this first aspect of the present invention the first and second crankshafts are connected to the common output shaft through respective clutches whereby the common output shaft can be driven either in a first mode by outputs of both of the first and second crankshafts or in a second mode by output of only one of the first and second crankshafts, with the other of the first and second crankshafts isolated from rotation of the output shaft by its associated clutch. The clutches are preferably one-way clutches. This first aspect of the present invention further includes starter gearing independently associated with each of the first and second crankshafts and a starter mounted for selective engagement with the starter gearing of either of the crankshafts.

In a second aspect the present invention provides an internal combustion engine for a vehicle having variable displacement and including first and second engine crankshafts mounted within a single unitary engine block. As in the first aspect of the present invention, each of the crankshafts is connected to at least two pistons received in respective cylinders and defining combustion chambers therein whereby each crankshaft is rotatably driven by combustion of fuel in the combustion chambers associated with the connected pistons. Also in common with the first aspect, a common output shaft receives torque from both of the first and second crankshafts for powering the vehicle with the combined power outputs. First and second clutches respectfully connect the first and second crankshafts to first and second output gears which drive an input gear fixed on the common output shaft. In the second aspect of the invention an accessory drive for driving accessory systems of the vehicle is driven off of the common output shaft, for example, through an output gear on the common output shaft or through the input gear of the common output shaft.

A third aspect of the present invention provides an internal combustion engine for a vehicle having variable displacement and including first and second engine crankshafts mounted within a unitary single engine block. As in the other aspects of the present invention, each of the crankshafts is connected to at least two pistons respectively received in cylinders to define combustion chambers therein whereby each crankshaft is rotatably driven by combustion of fuel in the combustion chambers associated therewith. As in the first and second aspects of the present invention a common output shaft receives torque from both of the first and second crankshafts and powers travel of the vehicle with the combined power. At least one of the first and second crankshafts is connected to the common output shaft through a clutch whereby the common output shaft can be driven either in a first mode by outputs of both of the crankshafts or in a second mode by only one of the crankshafts with the other crankshaft isolated from rotation of the output shaft by the clutch. In this third aspect an accessory drive for driving accessory systems of the vehicle is connected to the first and second crankshafts through respective one-way clutches whereby the accessory drive receives power from any crankshaft which is operating, yet is isolated from any crankshaft that is not operating. Again, the clutches may be one-way clutches.

In a fourth aspect, the present invention provides an internal combustion engine for the vehicle having variable displacement and including first and second engine crankshafts mounted within and extending through a single unitary engine block and providing independent first and second torque outputs at one end of the engine block. As in the other aspects of the present invention each crankshaft is connected to at least two pistons received in respective cylinders to define combustion chambers therein whereby each crankshaft is driven by combustion of fuel in the combustion chambers associated therewith. This fourth aspect of the present invention also includes an accessory drive for driving accessory systems of the vehicle, which accessory drive is connected to the first and second crankshafts through respective one-way clutches, whereby the accessory drive receives power from any crankshaft which is operating yet is isolated from any crankshaft that is not operating.

The present invention provides a first option (strategy A) in which the first crankshaft unit always provides the first increment of displacement and power, with the second unit being added as needed, or a second option (strategy B) of either the first crankshaft unit or the second crankshaft unit providing the first increment of displacement and the remaining unit being added as needed. No prior art device is capable of carrying out both strategies while retaining all of the commercially desirable advantages cited above.

Additional advantages of the invention under operating strategy A include: (1) lower hardware cost owing to fewer clutch means (for example, the accessories can be driven directly by the first crankshaft); (2) flexibility for the second crankshaft unit to be different from the first, e.g., because the second unit is expected to be rarely used it can be constructed from less expensive materials; (3) the secondary unit need not have a flywheel because, being used primarily to match the speed of a primary unit, it will never operate at a low speed where a flywheel is needed to smooth the speed fluctuations of the crankshaft. This also reduces cost and allows a quicker "spin up" to add the second increment of power more quickly.

Advantages of strategy B include: (1) each crankshaft unit can be identical, allowing cost savings associated with higher volume of components, e.g., pistons; (2) increased durability, because each crankshaft unit would equally likely serve as the first crankshaft unit and thus would likely last approximately twice as long, and regular operation (at least every other engine start) reduces engine starting wear; (3) increased reliability, i.e., if a failure occurred in one of the crankshaft units, the other unit could immediately be transferred to the status of the primary crankshaft unit for reliable operation in travel to a repair facility.

The present invention varies displacement by use of a multiple-crankshaft engine design in which at least two distinct crankshafts and cylinder banks are contained within a single engine block. The crankshafts are independent so that each can rotate either singly or in combination. A first crankshaft operates pistons which represent a first displacement, for example, two liters of displacement, and a second crankshaft operates pistons which provide an additional or "second" displacement which may be the same as or significantly different from the first displacement, for example, two liters of displacement. When relatively low power is needed the first crankshaft unit is operated alone at a higher relative load, i.e., higher than that at which it would run if all crankshaft units were operating, thus allowing it to operate at a higher relative efficiency. When higher power is commanded than can be supplied by the first crankshaft unit, the second crankshaft unit is activated, and together the two crankshaft units supply the commanded power.

The preferred embodiment to be described in the following has dual crankshafts in a parallel configuration, but it should be understood that there are many alternative configurations that lie within the spirit of the invention and the scope of the claims and that, upon reading the disclosure, will become apparent to those skilled in the art. For example, additional crankshaft units can optionally be utilized to progressively add additional power in the same manner. Although the crankshafts can be arranged in various relative positions, the most likely configurations are series (end to end) and parallel (side by side). The present invention can readily be seen to include a family of engines, for example with each crankshaft unit having one, two, three, four, five or more pistons. In a two-crankshaft embodiment the corresponding result would be a two, four, six, eight, ten or more piston engine.

The two or more crankshafts and their associated cylinder banks preferably share one or more of a single oil pump, single water pump, single cooling system, single lubrication system, single air filter, single fuel system, single engine block, single exhaust system and single oil pan.

Preferred embodiments of the invention will now be described with reference to the appended set of drawings.

Through the above and other features to be disclosed herein the present invention provides on-command variable displacement. Further, the present invention also provides the previously mentioned features considered necessary for commercial practicality and acceptance: (a) uninterrupted accessory drive; (b) low cost of manufacture, including operability with conventional automotive components, and minimal duplication of components (starting, cooling, lubrication, accessories, and other support systems); (c) smooth transitioning among units of displacement; (d) good lifetime and reliability; and (e) an option for multiple output shafts for use with unconventional hybrid drive systems.

(a) Uninterrupted Accessory Drive

The invention utilizes a unique means to allow a zero displacement mode without interrupting power to accessories that require a direct power drive. A first preferred embodiment provides a separate power drive accessories system which operates the accessories with a drive motor (e.g., electric or hydraulic) independent of either crankshaft unit. This option allows the accessories to be driven at a speed that is optimum for the demands being placed on the accessories. In another preferred embodiment, this drive system is mounted to the engine with drive attachments (through clutch means) to each crankshaft, as will be described later, and in this configuration the separate drive motor drives through clutch means as well. When either crankshaft unit is operating, the accessories are directly driven by power from the operating crankshaft(s). When neither crankshaft unit is operating, the drive motor drives accessories through its clutch drive means. A third preferred embodiment for satisfying accessory needs insures at least one crankshaft unit is operating when accessory needs exist, whereby the separate drive motor of the previous embodiments can be omitted.

(b) Low Cost of Manufacture

Low cost of manufacture involves both maintaining operability with conventional automotive components and minimal duplication of components.

The invention utilizes a single starter to start both displacement units. A preferred embodiment includes a single starter which can engage a first crankshaft unit to start it and then when more power is commanded than the first crankshaft unit can supply alone, the starter engages a second crankshaft unit to start it, by means as will be described later. In another embodiment the first crankshaft unit is started with a dedicated starter and the second unit is started by activating its clutch to rapidly raise its speed to that of the first crankshaft unit.

By integrating the separate crankshafts into a common block, each displacement unit shares the same cooling system and lubrication system.

Compatibility of the power plant with existing automotive components is assured by (a) providing means as described above to drive conventional power drive accessories without interruption, allowing off-the-shelf components to be used without substantial redesign; and (b) delivering a single output shaft for attachment to conventional transmissions by means of a unique clutching and gearing system.

(c) Smooth Transitioning

Smooth transitioning among various units of displacement is achieved in one embodiment by adopting an operating strategy in which one displacement unit is designated as a permanent secondary unit and its flywheel is eliminated, allowing it to spin up faster.

(d) Reliability and Lifetime

Reliability and lifetime are improved by a first preferred operating strategy in which the two displacement units interchangeably serve as primary or secondary displacement units, thereby reducing the potential for uneven wear and guaranteeing that a first increment of displacement is always available for emergency use even when one of the units has failed.

(e) Option for Multiple Output Shafts

The present invention can also provide separate crankshaft outputs to provide certain advantages for powertrains which transmit power to the drive wheels by electric or hydraulic motors.

In addition to the preferred operating strategy described in the foregoing, a second operating strategy designates one displacement unit as a secondary unit that receives intermittent use which, in turn, allows it to be constructed less expensively than the primary unit.

DESCRIPTION OF THE PREFERRED EMBODIMENTS

Figure 1:
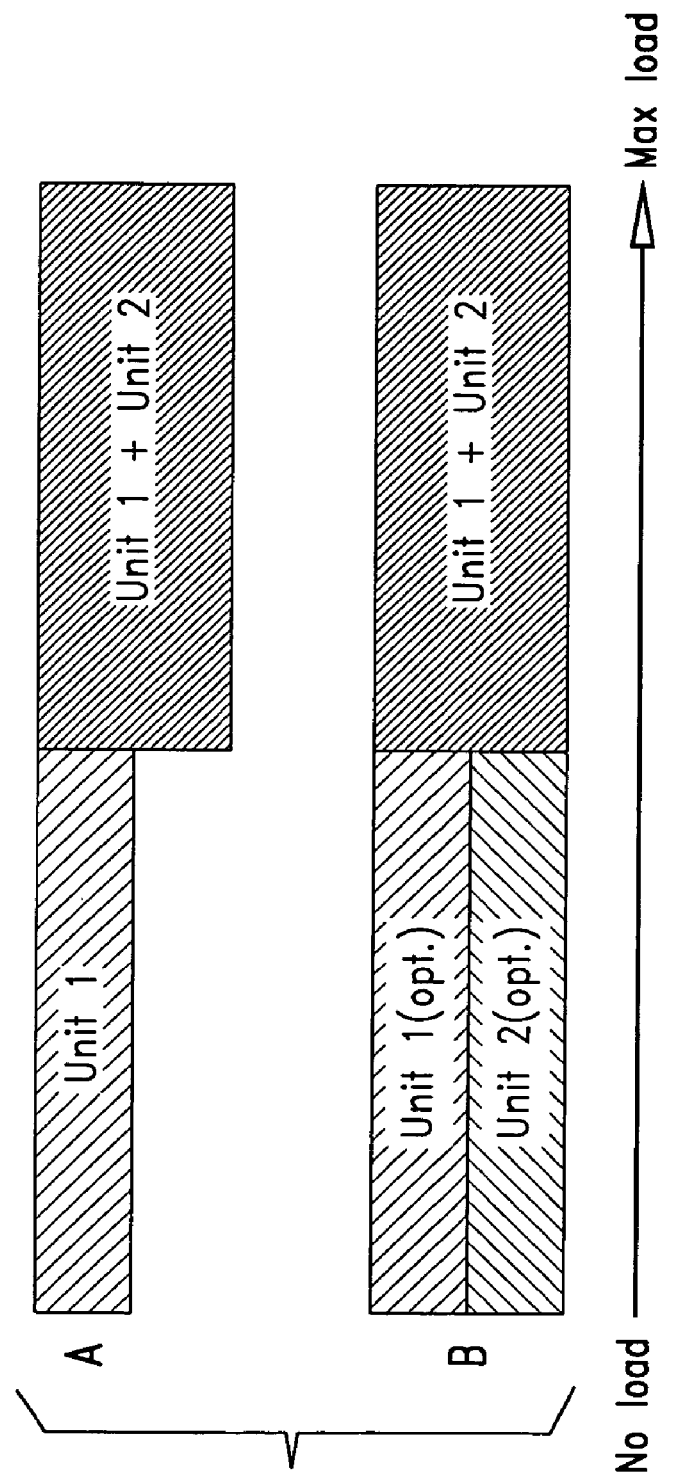
FIG. 1 is a schematic view illustrating two operating strategies in which the utilization of (for example) two displacement units is dependent on the relative amount of power demanded.

All of the preferred embodiments shown in the drawing figures and described in the ensuing discussion illustrate a pair of two-cylinder displacement units in a parallel arrangement for the purpose of clarity, with the realization that more than two displacement units, more or less than two cylinders per unit, and/or such units disposed in a series arrangement rather than a parallel arrangement, could equally well be employed within the scope of the invention.

FIG. 1 illustrates two different operating strategies, termed "A" and "B". According to operating strategy "A", a primary displacement unit "Unit 1" operates alone to power the vehicle when power demand is low to moderate. When power demand increases past a predetermined level (either a fixed level or a computed level based on operating conditions), "Unit 2" which is designated as a secondary unit begins operating to supplement the power of Unit 1. When the power demand once again drops below the predetermined level, Unit 2 shuts off and Unit 1 continues to power the vehicle by itself.

In the alternative operating strategy B, neither of Unit 1 and Unit 2 is permanently designated as primary or secondary, meaning that either may take on the role of primary or secondary unit arbitrarily. Operating under this strategy, when power demand is below the predetermined level, either Unit 1 or Unit 2 will have been selected to power the vehicle at this relatively low power demand. The selection might have been made randomly, in an alternating sequence between Unit 1 and Unit 2, or by a different selection method. When power demand exceeds the predetermined level, the unit which is not already in operation is activated to supplement the power of the operating unit. When the power demand again drops below the predetermined level, either Unit 1 or Unit 2 is shut off, leaving the other unit to power the vehicle by itself until power demand increases to the predetermined level again.

It can be seen that under operating strategy A, Unit 1 will always come into operation before Unit 2, will accumulate more hours of duty than Unit 2, and will see a more constant (less intermittent) duty cycle than Unit 2. On the other hand, under operating strategy. B, both units may take turns acting as primary or secondary, and so each will see very similar patterns of duty. Clearly operating strategy B is to be preferred for durability reasons, because each unit receives the same amount of use and sees the same patterns of duty. This also allows both units to be constructed of similar quality if not identical parts, improving economies of scale in mass production. Reliability and safety are also improved because if one unit fails, the other unit can be used to drive the car to the shoulder of the road or even to a repair facility. Accordingly, operating strategy B is the currently preferred operating strategy for the present invention, although it should be noted that any hardware capable of enabling operating strategy B is also capable of operating in accordance with strategy A if so desired.

Figure 2:
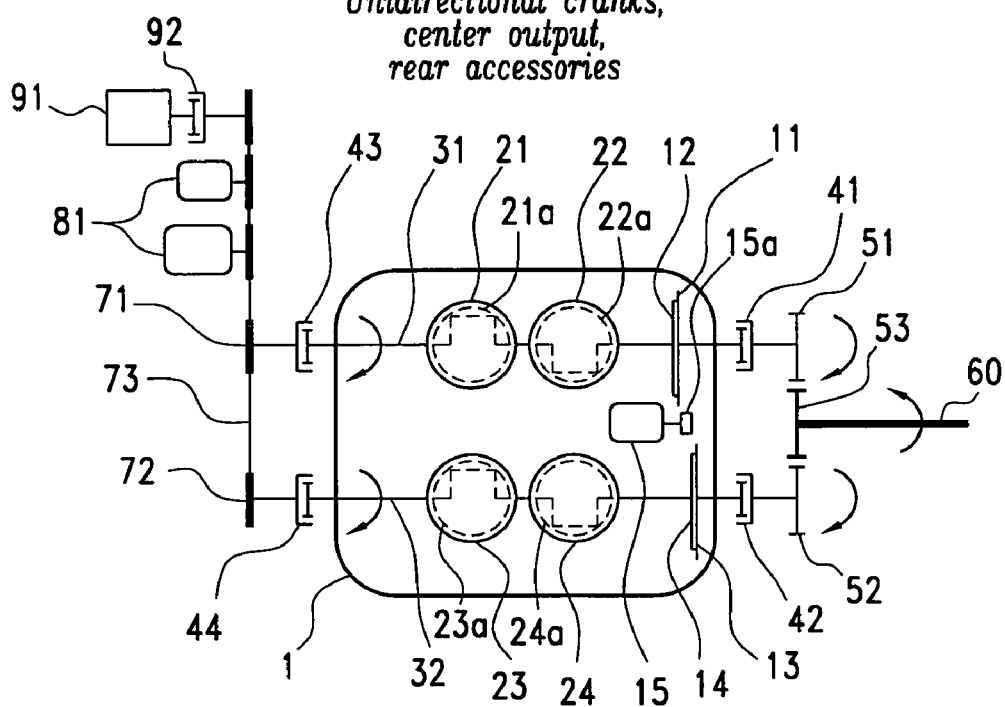
FIG. 2 is a schematic view of a first embodiment in which the crankshafts of the two displacement units rotate in the same direction.

FIG. 2 depicts a preferred embodiment in which two displacement units have crankshafts that rotate in the same direction. Engine block 1 contains internal combustion engine cylinders 21 and 22 with pistons 21a and 22a mounted therein to define combustion chambers and connected with first crankshaft 31 in the usual manner via connecting rods and wrist pins (not shown). The same is true for cylinders 23 and 24 and pistons 23a, 24a, which connect to second crankshaft 32, all of which are also mounted within engine block 1. Connected to first crankshaft 31 are ring gear 11 and flywheel 12, and similarly second crankshaft 32 is supplied with ring gear 13 and flywheel 14. The ring gears 11 and 13 and gear 15a of starter 15 are all axially spaced. In this and all other embodiments in which crankshafts 31 and 32 rotate in the same direction, starter 15 preferably selectively engages with ring gear 11 or 13 in order to start the respective crankshaft 31 or 32, the starter gear 15a being made to selectively engage and disengage with either ring gear by conventional engagement means such as a Bendix style solenoid mechanism. Accordingly the starter is preferably provided with two solenoid actuation positions, one to engage only ring gear 11 and another to engage only ring gear 13, rather than the single engagement position that is familiar to those skilled in the art of single crank engines. In all embodiments described herein the flywheels 12, 14, and accordingly starter 15, may be placed on either end of the crankshafts. One-way clutches 41 and 42 (such as Sprague clutches that clutch in one rotational direction and overrun in the other) are disposed on the first and second crankshafts and transmit their output to gears 51 and 52, respectively, thereby causing output gear 53 and output shaft 60 to rotate in a direction opposite to that of the crankshafts. The placement of output gear 53 between gears 51 and 52 allows both gears 51 and 52 to transmit their respective shares of the total power output directly to the output gear 53, and allows for the cancellation of gear separation forces encountered among gears 51–53, for the bearings of gear 53. The provision of one-way clutches 41 and 42 ("first and second one-way clutches") allow either crankshaft unit to operate alone and independently of the other. For example, if crankshaft 31 is not operating while crankshaft 32 is operating, one-way clutch 41 isolates crankshaft 31 from gear 51 which rotates regardless. The same behavior is true of the converse in which the operating status of crankshafts 31 and 32 are switched. In a motor vehicle application, output shaft 60 would be connected to a conventional transmission in the same way as would the output shaft of a normal internal combustion engine. To start either displacement unit independently, starter 15 is disposed to selectively engage with either ring gear 11 or 13 ("starter gearing") in order to start either crankshaft 31 or 32 respectively. At the other end of the power plant, crankshafts 31 and 32 rotate two pulleys 71 and 72 through one-way clutches 43 and 44 ("third and fourth one-way clutches") respectively. Belt 73 connects these pulleys with the pulleys of an accessory set 81, thereby providing the accessory set with a direct power drive. The accessory set 81 for example may include a power steering pump, air conditioner compressor, and/or similar automotive power drive accessories. Owing to the operation of one-way clutches 43 and 44, the accessory drive receives power from any crankshaft that is operating, yet is isolated from any crankshaft that is not operating. All embodiments described herein may, in the alternative, have the accessories driven through gears or chain rather than with a belt.

Operating strategy B might dictate that power demands of less than 30 HP, for example, be served by a single displacement unit while greater power demands shall be served by both units (it should be noted that the operating strategy could alternatively utilize a variable power threshold rather than a fixed value). For example, if 25 HP were demanded, and the control strategy had previously selected crankshaft 32 to supply that power, crankshaft 32 would be placed in operation while crankshaft 31 would remain inactive. As crankshaft 32 rotates counterclockwise (for example), with one-way clutch 42 transmitting power downstream in that direction, gear 52 rotates counterclockwise and causes output gear 53 to rotate clockwise, delivering 25 HP, for example, from crankshaft 32 to the drivetrain. Simultaneously, the clockwise rotation of output gear 53 causes gear 51 to rotate counterclockwise, but because one-way clutch 41 does not transmit power upstream in that direction, inactive crankshaft 31 is not affected. Accessories 81 are driven by a similar power transfer path. One-way clutch 44 transmits power to pulley 72, while one-way clutch 43 isolates inactive crankshaft 31 from the resultant rotation of pulley 71. Belt 73 thus transmits power to accessory set 81. Auxiliary accessory drive 91–92 is preferably not in operation in this mode.

If the power demand were to suddenly spike to 50 HP, for example, the control strategy dictates that crankshaft 31 (the inactive crankshaft) should be activated because crankshaft 32 is already operating. Starter 15 engages with ring gear 11 and turns crankshaft 31 to start its cylinder bank operating in the normal manner of internal combustion engines. Crankshaft 31 is rapidly spun up to the speed of gear 51 which is already turning as previously described, at which point one-way clutch 41 can begin transmitting power downstream to gear 51 and output gear 53, where it combines with the power of the other crankshaft to fully meet the 50 HP demand. Similarly, one-way clutch 43 which was previously overrunning to isolate crankshaft 31 when it was inactive, now begins to transmit power to the accessory drive so that now both crankshafts are contributing power to the accessories.

If the power demand were to drop to 25 HP, for example, either crankshaft 31 or 32 may arbitrarily be deactivated, while the other remains active to supply the 25 HP. Suppose that crankshaft 32 is given a rest and crankshaft 31 remains active. The same general power flow previously described takes place again, except now the power is flowing from crankshaft 31 instead of crankshaft 32, and one-way clutches 42 and 44 are now acting to isolate rather than drive.

Finally, if no power at all is demanded to drive the vehicle, but the accessories still demand some power, in a first preferred embodiment, an accessory drive 91 would be activated to provide power drive via one-way clutch 92, allowing both crankshafts to be turned off without interrupting the accessories. Accessory drive 91 is preferably powered by a hydraulic, electric, or other auxiliary power source that is part of a hybrid powertrain installation. In an alternative embodiment, accessory drive 91 powers the accessories at all times and pulleys and belts 71–73 and one-way clutches 43, 44, and 92 are thus omitted. Advantages of this latter embodiment are the ability to operate accessories at a constant optimum speed and a reduction in parts. In a third embodiment, accessory drive 91 and one-way clutch 92 are omitted, and an operating strategy is adopted that ensures that at least one crankshaft will be operating at all times so that accessory power is never interrupted.

Gears 51 and 52 and output gear 53 need not have the same size as depicted, but instead may vary in their relative sizes to effect a desired gear ratio among them. For example, if it is determined that in a particular application the output shaft 60 of the system should operate at a faster speed than that of the two crankshaft units, output gear 53 may be sized smaller than gears 51 and 52. The opposite applies if the output speed is to be slower. In addition, gears 51 and 52 do not have to be the same size. For example, if due to design or optimization considerations it is desirable that crankshaft 31 operate at a slower speed relative to crankshaft 32, then gear 51 may be sized larger than gear 52. Other variations in gear sizing will become obvious to those skilled in the art.

Figure 3:
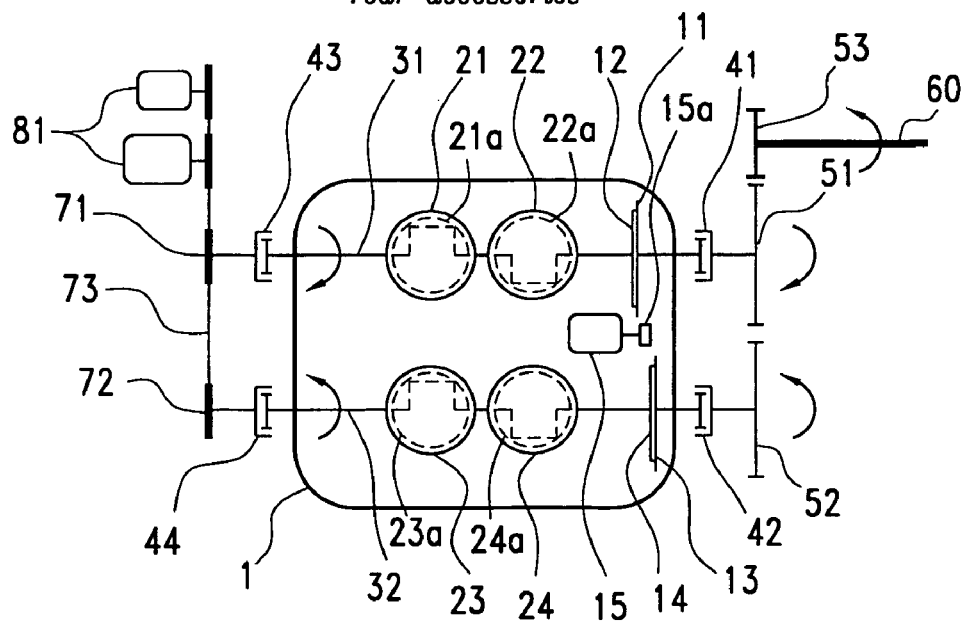
FIG. 3 is a schematic view of another embodiment in which the crankshafts rotate in opposite directions.

FIG. 3 depicts an alternative embodiment in which crankshafts 31 and 32 rotate in opposite directions, and output gear 53 is relocated to one side of gears 51 and 52. As in the previous embodiment, starter 15 preferably selectively engages withering gear 11 or 13 in order to start their respective crankshaft 31 or 32, the starter gear 15a being made to selectively engage and disengage with either ring gear by conventional engagement means such as a Bendix style solenoid mechanism. Accordingly the starter is preferably provided with two solenoid actuation positions, one to engage only ring gear 11 and another to engage only ring gear 13, rather than the single engagement position that is familiar to those skilled in the art of single crank engines. Additionally, in the current embodiment and all other embodiments in which crankshafts 31 and 32 rotate in opposite directions, the starter 15 operates bidirectionally, rotating in a first direction appropriate to crankshaft 31 when engaged with ring gear 11, and in a second (opposite) direction when engaged with ring gear 13. Accessories may still be driven by pulleys and belt 71–73, if the belt is routed appropriately as is known in the art. Furthermore, the auxiliary drive system 91–92 of FIG. 2 could optionally be added as depicted in that figure.

Figure 4:
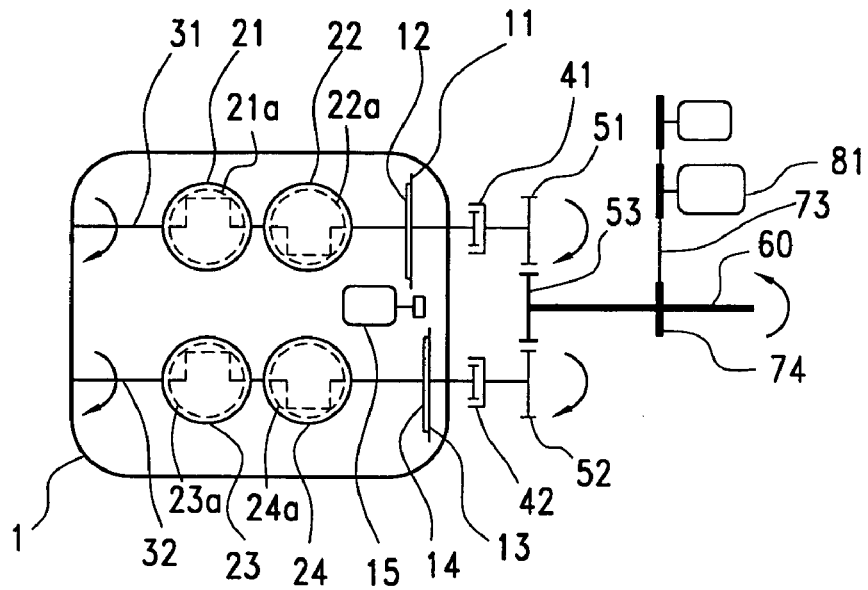
FIG. 4 is a schematic view depicting an alternative version of the embodiment of FIG. 2 with accessories driven at the front, rather than the rear.

FIG. 4 depicts still another embodiment similar to that of FIG. 2 but with accessories being driven at the front of the device rather than the rear, in part via a pulley 74 mounted to output shaft 60. This allows the option of powering accessories by the momentum of the vehicle when the vehicle is in motion. The function of the pulley 74 can be served instead by a nose gear or similar device and pulley 74 could be located on the shaft of gear 51 or the shaft of gear 52.

Figure 5:
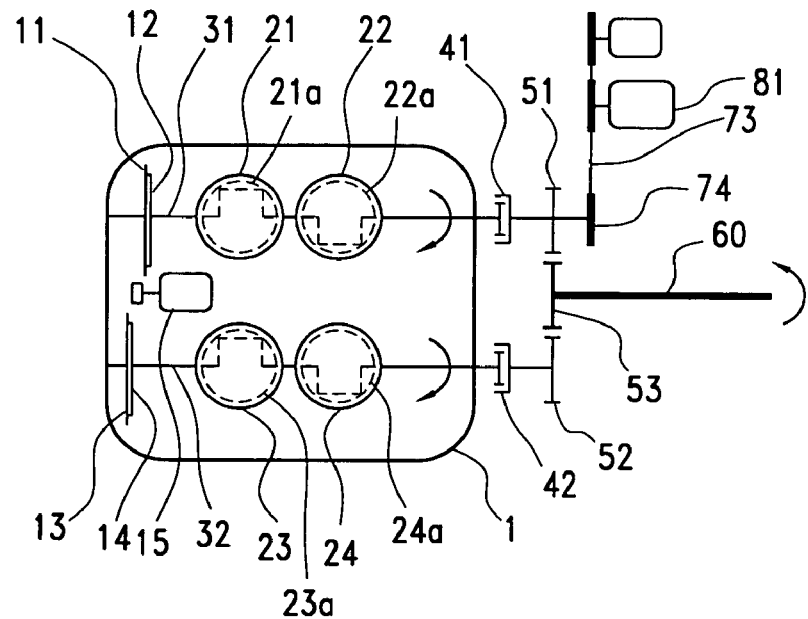
FIG. 5 is a schematic view of an embodiment which is a modification of the embodiment of FIG. 4 wherein the starter motor 15 and crankshaft gearing associated with same is located at the rear of the engine, rather than at the front.

FIG. 5 depicts yet another embodiment, this embodiment similar to FIG. 4 but with the starter motor at the rear of the engine rather than in the front as in the previously described embodiments and also, by way of example, has pulley 74 mounted on shaft of gear 51 rather than on output shaft 60.

Figure 6:
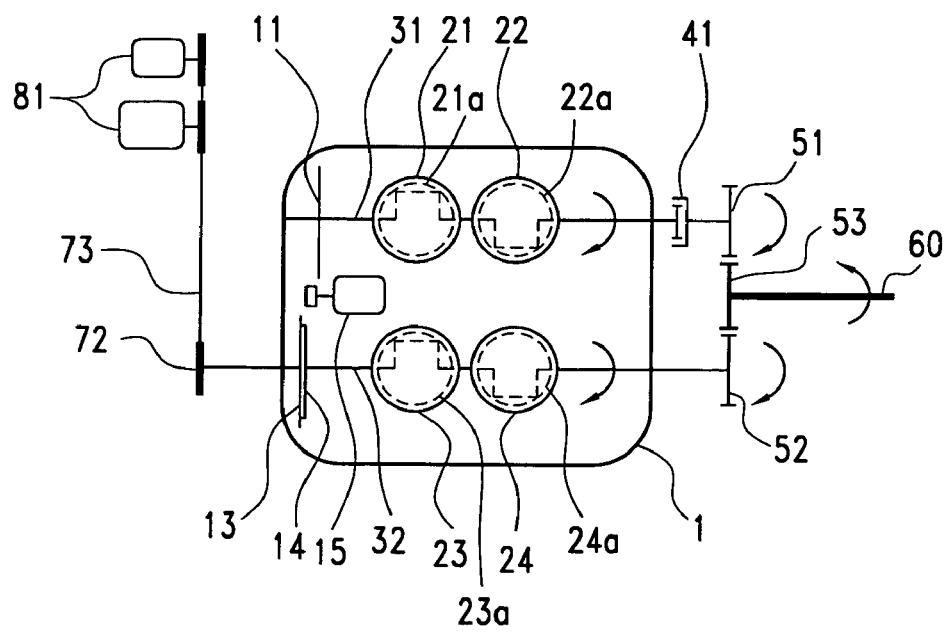
FIG. 6 is a schematic view of yet another embodiment, this embodiment having only a single crankshaft clutch which simplifies the structure but limits the operation to a strategy "A"

FIG. 6 depicts an embodiment with the single crankshaft clutch 41 which permits operation only in the aforementioned strategy "B" with crankshaft 32 permanently designated as the primary source of power and with crankshafts 31 and 32 rotatable in the same direction. As in the previously described embodiments, a single starter motor 15 is used to start operation of crankshaft 32 and to start, as necessary, operation of crankshaft 31. Note that crankshaft 31 has no flywheel. Because crankshaft 31 will operate only at relatively high speeds to supplement crankshaft 32, crankshaft 31 does not require as much rotational inertia and therefore is not provided with a flywheel.

Figure 7:
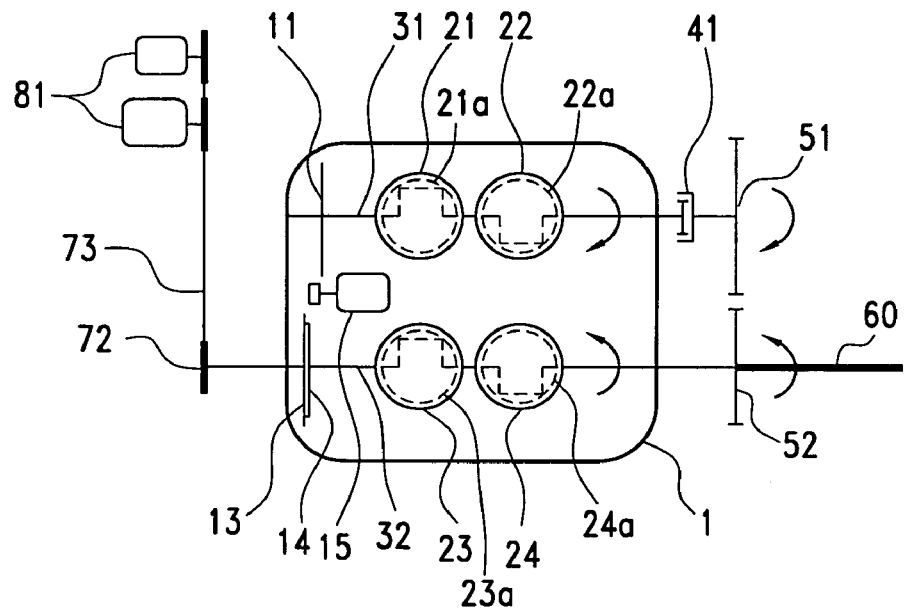
FIG. 7 is a schematic view of still another embodiment wherein the output shaft is integral with one of the crankshafts.

FIG. 7 shows an alternative embodiment wherein the common output shaft 60 is integral with shaft 32. In this embodiment crankshafts 31 and 32 counterrotate and starter motor 15 is bidirectional. As in the embodiment of FIG. 6, crankshaft 31 has no flywheel.

Figure 8:
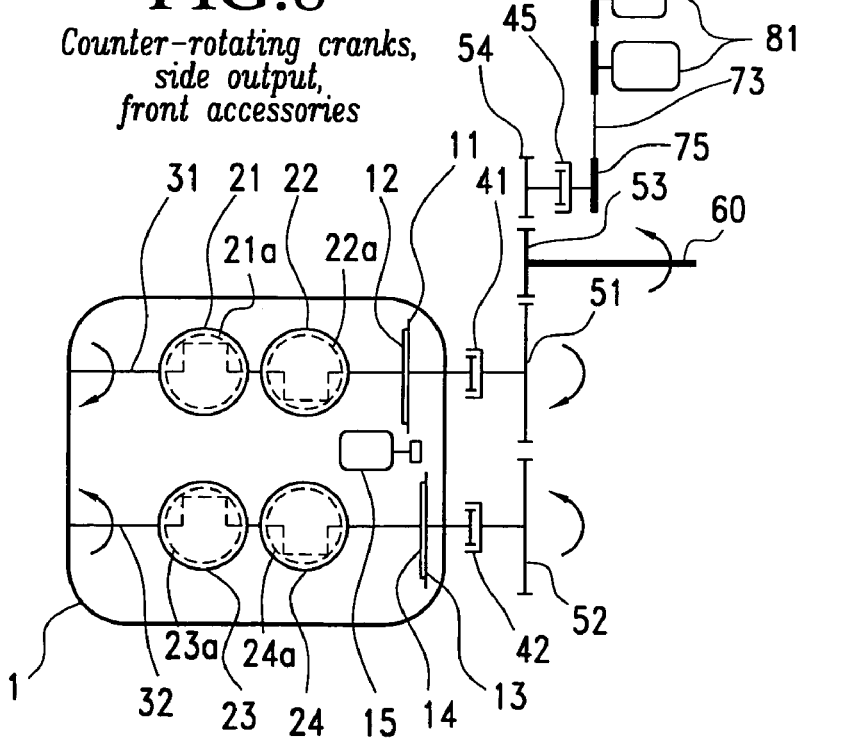
FIG. 8 is a schematic view depicting an alternative version of the embodiment of FIG. 3, also with accessories driven at the front.

FIG. 8 depicts yet another embodiment with counter-rotating cranks 31 and 32, a side output gear 53, and accessories on the front driven by another side gear 54. Starter 15 operates bidirectionally as in FIG. 3. This embodiment also allows the option of powering accessories by the momentum of the vehicle. Also illustrated is an optional auxiliary accessory power drive 92 which can drive the accessories when no vehicle momentum is available. Optional one-way clutches 45 and 91 allow power to flow toward the accessories 81 but not the other way, so that the accessory drive 92 may be used to drive the accessories even when the vehicle is not in motion, i.e. output shaft 60 is not rotating or is rotating at insufficient speed. The auxiliary drive system 91–92 could easily be applied to the system of FIG. 4, by mounting the pulley 74 of FIG. 4 on a concentric one-way clutch that transmits power only in the upstream direction from output shaft 60.

Figure 9:
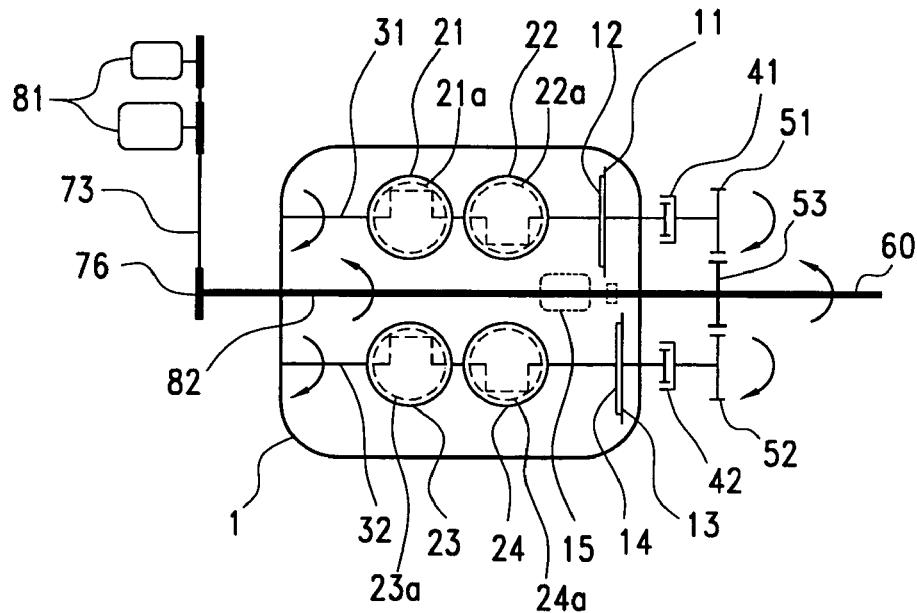
FIG. 9 is a schematic view of an embodiment in which accessories are driven by a jackshaft connected to the common power output shaft.

FIG. 9 depicts yet another embodiment in which accessories are directly driven by a jackshaft 82 that extends the output shaft backward to the rear of the engine, with pulley 76 replacing pulleys 71 and 72 in other embodiments. The function of pulley 76 and belt 73 could alternatively be fulfilled by a gear or chain drive or other device as is known in the art, if the accessories 81 are adapted to such a drive means.

Figure 10:
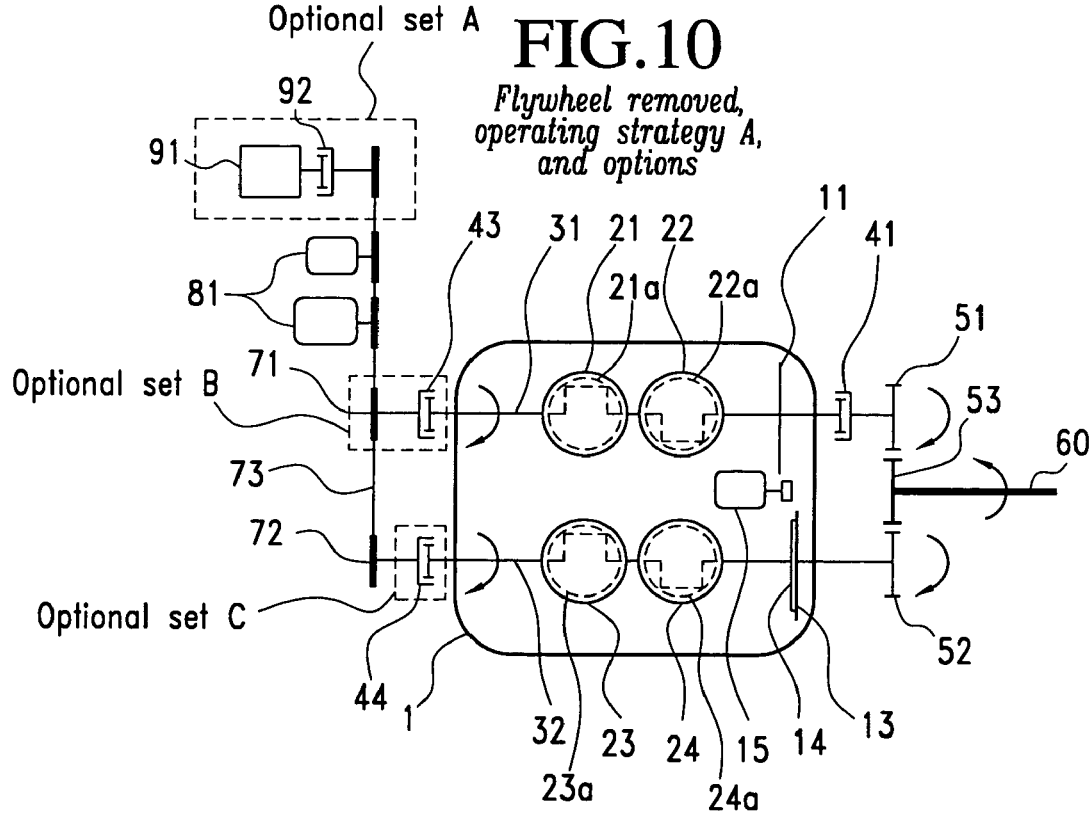
FIG. 10 is a schematic view of an alternative version of the embodiment of FIG. 2 in which one flywheel has been omitted.

FIG. 10 depicts yet another embodiment optimized for operating strategy A. Here, crankshaft 32 is designated as the permanent primary crankshaft, meaning that crankshaft 31 will only operate at relatively high speeds to supplement crankshaft 32 and will never run alone. Hence crankshaft 31 is not supplied with a flywheel because it does not need as much rotational inertia to operate. Omitting the flywheel allows crankshaft 31 to be brought to speed faster to supplement crankshaft 32, resulting in a faster response to spikes in power demand. Alternatively, in this embodiment and in the other embodiments where crankshaft 31 has no flywheel, crankshaft 31 could be provided with a light flywheel, i.e., much lighter than that on crankshaft 32. Indeed, the ring gear on crankshaft 31 might be regarded as serving as a light flywheel.

In this embodiment, crankshaft 31 will never operate independently of crankshaft 32. This leads to several options relating to the powering of accessories. Optional drive A is the combination of the previously disclosed accessory drive 91 and overrunning clutch 92; optional drive B has the crankshaft 31 drive the accessories via the previously described pulley 71 and overrunning clutch 43; and optional drive C depicts an overrunning clutch 44 interposed between crankshaft 32 and accessory drive pulley 72.

In the simplest configuration of this embodiment, none of optional drives A, B and C is used. Because crankshaft 32 is always operating and crankshaft 31 is never operating independently of it, and because the accessory drive 91–92 is omitted and so cannot drive accessories while neither crankshaft is operating, there is no need to isolate crankshaft 32 from the accessories via clutch 44. There is also no need to provide any type of connection between crankshaft 31 and the accessories, because if the crankshaft 31 is in operation it means that crankshaft 32 is also operating and hence is available to power the accessories by itself.

In an alternative configuration, optional drive sets A and C are both provided, and optional drive set B is omitted. This allows accessories to be driven by accessory drive 91– 92 while crankshaft 32 is not operating. Overrunning clutch 44 then becomes necessary to isolate crankshaft 32 from the operating accessories when crankshaft 32 is inactive.

A third variation in which optional drives A, B and C are all used is also preferred. Here, the addition of optional drive B allows crankshaft 31 to assist crankshaft 32 with the powering of accessories, and allows crankshaft 31 to be isolated from the accessories when it is inactive. Another closely related alternative would omit drive A and drive C and provide only drive B. This configuration would operate in much the same way except that the accessory drive 91–92 is no longer available to drive the accessories independently of either crankshaft, and so overrunning clutch 44 is no longer necessary to isolate crankshaft 32 when inactive.

Figure 11:
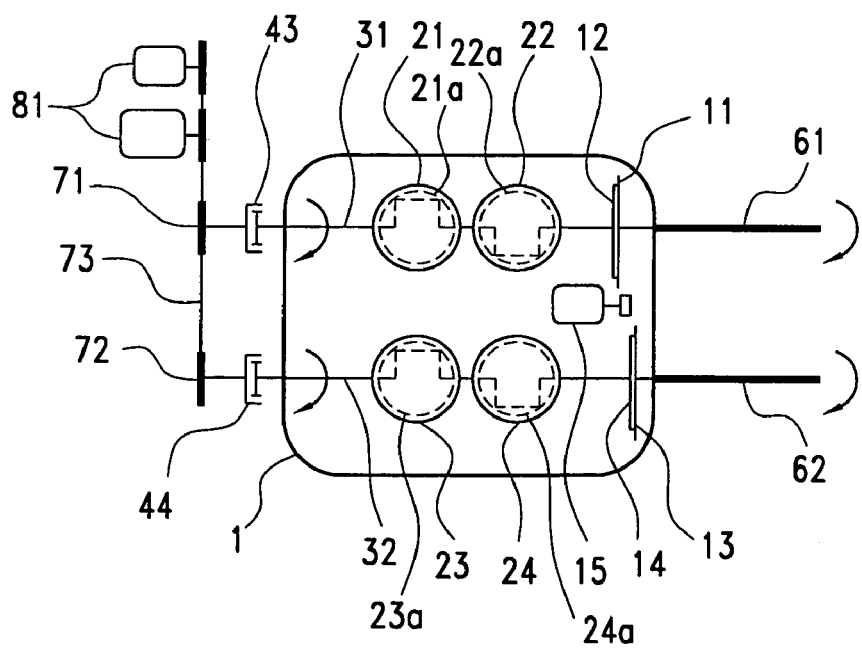
FIG. 11 is a schematic view of an alternative embodiment in which the common power output shaft of the other versions is omitted and instead both crankshafts deliver their power independently via two respective output shafts.

Finally, FIG. 11 depicts an embodiment suitable for use in a hybrid powertrain that utilizes two separate power output shafts instead of a single output shaft. Output shafts 61 and 62 replace output shaft 60 of the other embodiments, allowing the power from each individual crankshaft to be accessed directly. For example, in an appropriate hybrid powertrain, output shaft 61 might power a hydraulic pump that charges an accumulator with pressurized fluid for later use by a hydraulic motor, while output shaft 62 interfaces with a conventional transmission. In another hybrid configuration, both output shafts 61 and 62 may individually power hydraulic pump/motors (or electric motor/generators) and each pump/motor (or electric motor/generator) acting as a motor may start its displacement unit. Again, the already familiar auxiliary accessory drive 91–92 may be optionally added as depicted in, for example, FIG. 2.

In all embodiments, the starter 15 need not be electric and instead may, for example, be a hydraulic motor powered by pressurized hydraulic fluid, or an inertial device that is driven by vehicle momentum, or a different device appropriate to whatever power source is installed in the vehicle. Alternatively, in all embodiments, rather than engaging the ring gears 11 and 13, the starter 15 may engage the crankshafts via a clutched belt and pulley drive, chain drive, or gear, in straightforward ways that would be apparent to anyone skilled in the art. Additionally, it is clear to anyone skilled in the art that flywheels 11 and 13 and starter 15 could alternatively be mounted at the rear of the crankshafts 31 and 32 rather than on the front as depicted, a fact which is true of all embodiments described herein. Further, although all embodiments have been described as having accessories driven by a conventional belt and pulley direct drive means, their function could instead be served by a direct gear drive, or by a chain and sprocket drive, or by any other conventional method commonly employed in the art. It is also clear that auxiliary accessory drive components 91–92 may optionally be fitted to any of the embodiments disclosed herein, whether or not explicitly depicted in the drawing figures.

It will be obvious to those skilled in the art that the concept of driving accessories by means of a separate electric, hydraulic, or other power source, rather than an engine crankshaft, can equally well apply to power plants employing a single crankshaft as well as to the multiple crankshaft embodiments described herein.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. An internal combustion engine for a vehicle, said internal combustion engine providing variable displacement and comprising:
   first and second engine crankshafts mounted in parallel within said single unitary engine block;
   at least two first cylinders and pistons received in each of said first cylinders to define combustion chambers therein and connected to said first engine crankshaft to rotatably drive said first crankshaft by combustion of fuel in the combustion chambers of said first cylinders;
   at least two second cylinders and pistons received in each of the second cylinders to define combustion chambers therein and connected to said second crankshaft to rotatably drive said second crankshaft by combustion of fuel in the combustion chambers of said second cylinders;
   a common output shaft for receiving power output from both of said first and second crankshafts, for combining the power outputs and for powering travel of the vehicle with the combined power output;
   a first clutch connecting one of said first and second crankshafts to said first and second output gears, said common output shaft carrying a first input gear meshed with at least one of said first and second output gears; and
   an accessory drive for driving accessory systems of the vehicle, said accessory drive being driven off of said common output shaft.

2. An internal combustion engine according to claim 1 wherein said first input gear is located to the side of said first and second output gears and is connected to said first output gear through said second output gear, wherein said accessory drive includes a second input gear driven off of said first input gear and further comprising a third clutch interposed between said second input gear and said accessory systems.

3. An internal combustion engine according to claim 1 further comprising a third output gear fixed on said common output shaft, said accessory drive being driven off of said third output gear.

4. An internal combustion engine according to claim 3 wherein said first input gear is located between said first and second output gears.

5. An internal combustion engine according to claim 1 further comprising starter gearing independently associated with each of said first and second crankshafts and a starter mounted for selective engagement with the gearing of either of said first and second crankshafts.

6. An internal combustion engine according to claim 1 wherein said output shaft extends through said single unitary engine block and said accessory drive is driven off said output shaft at a first end of said single unitary engine block and said output shaft is driven off said first and second crankshafts at a second end of said single unitary engine block opposite said first end.

7. An internal combustion engine for a vehicle, said internal combustion engine providing variable displacement and comprising:
   a single unitary engine block;
   first and second engine crankshafts mounted in parallel within said single unitary engine block;
   at least two first cylinders and pistons received in each of said first cylinders to define combustion chambers therein and connected to said first engine crankshaft to rotatably drive said first crankshaft by combustion of fuel in the combustion chambers of said first cylinders;
   at least two second cylinders and pistons received in each of the second cylinders to define combustion chambers therein and connected to said second crankshaft to rotatably drive said second crankshaft by combustion of fuel in the combustion chambers of said second cylinders;
   a common output shaft for receiving power output from both of said first and second crankshafts, for combining the power outputs and for powering travel of the vehicle with the combined power output;
   a first crankshaft clutch connecting one of said first and second crankshafts to said common output shaft, whereby said common output shaft can be driven either in a first mode by outputs of both of said first and second crankshafts or in a second mode by output of only the other of said first and second crankshafts, with the one crankshaft isolated from rotation of said output shaft by said first crankshaft clutch;
   an accessory drive for driving accessory systems of the vehicle; and
   first and second accessory clutches respectively connecting said first and second crankshafts to said accessory drive, whereby the accessory drive receives power from any crankshaft which is operating, yet is isolated from any crankshaft that is not operating.

8. An internal combustion engine according to claim 7 further comprising a second crankshaft clutch, said first and second crankshaft clutches respectively connecting said first and second crankshafts to said output shafts, whereby either of said crankshafts can be connected to said output shaft in said second mode.

9. An internal combustion engine according to claim 7 further comprising starter gearing independently associated with each of said first and second crankshafts and a starter mounted for selective engagement with the gearing of either of said first and second crankshafts.

10. An internal combustion engine for a vehicle, said internal combustion engine providing variable displacement and comprising:
- a single unitary engine block;
- first and second engine crankshafts mounted in parallel within and extending through said single unitary engine block and providing independent first and second torque outputs at one end of said single unitary engine block;
- at least two first cylinders and pistons received in each of said first cylinders to define combustion chambers therein and connected to said first engine crankshaft to rotatably drive said first crankshaft by combustion of fuel in the combustion chambers of said first cylinders;
- at least two second cylinders and pistons received in each of the second cylinders to define combustion chambers therein and connected to said second crankshaft to rotatably drive said second crankshaft by combustion of fuel in the combustion chambers of said second cylinders;
- an accessory drive for driving accessory systems of the vehicle; and
- first and second clutches respectively connecting said first and second crankshafts to said accessory drive, whereby the accessory drive receives power from any crankshaft which is operating, yet is isolated from any crankshaft that is not operating.

11. An internal combustion engine according to claim 10 further comprising starter gearing independently associated with each of said first and second clutches and a starter mounted for selective engagement with the starter gearing of either of said first and second crankshafts.

12. An internal combustion engine for a vehicle, said internal combustion engine providing variable displacement and comprising:
- a single unitary engine block;
- first and second engine crankshafts mounted in parallel within said single unitary engine block;
- at least two first cylinders and pistons received in each of said first cylinders to define combustion chambers therein and connected to said first engine crankshaft to rotatably drive said first crankshaft by combustion of fuel in the combustion chambers of said first cylinders;
- at least two second cylinders and pistons received in each of the second cylinders to define combustion chambers therein and connected to said second crankshaft to rotatably drive said second crankshaft by combustion of fuel in the combustion chambers of said second cylinders;
- an accessory drive for driving accessory systems of the vehicle; and
- first and second clutches respectively connecting said first and second crankshafts to said accessory drive, whereby the accessory drive receives power from any crankshaft which is operating, yet is isolated from any crankshaft that is not operating;
- a common output shaft for receiving output power from both of said first and second crankshafts, for combining the power outputs and for powering travel of the vehicle with the combined power output;
- third and fourth clutches respectively connecting said first and second crankshafts to said common output shaft, whereby said common output shaft can be driven either in a first mode by outputs of both of said first and second crankshafts with said third and fourth clutches engaged or in a second mode by output of only one of said third and fourth crankshafts with the other of said first and second crankshafts isolated from rotation of said output shaft by disengagement of the other of said third and fourth clutches.

* * * * *